(12) United States Patent
Yan et al.

(10) Patent No.: US 11,700,965 B2
(45) Date of Patent: Jul. 18, 2023

(54) METHOD FOR OPERATING A FOOD PROCESSOR

(71) Applicant: Vorwerk & Co. Interholding GmbH, Wuppertal (DE)

(72) Inventors: Wenjie Yan, Düsseldorf (DE); Maximilian Könnings, Zurich (CH); Maria Resende, Lisbon (PT)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 254 days.

(21) Appl. No.: 16/308,235

(22) PCT Filed: Jun. 8, 2017

(86) PCT No.: PCT/EP2017/063990
§ 371 (c)(1),
(2) Date: Dec. 7, 2018

(87) PCT Pub. No.: WO2017/211969
PCT Pub. Date: Dec. 14, 2017

(65) Prior Publication Data
US 2019/0261805 A1    Aug. 29, 2019

(30) Foreign Application Priority Data

Jun. 10, 2016 (DE) .............. 10 2016 110 710.7

(51) Int. Cl.
*A47J 27/00* (2006.01)
*A47J 43/046* (2006.01)
*A47J 43/07* (2006.01)

(52) U.S. Cl.
CPC .......... *A47J 27/004* (2013.01); *A47J 43/046* (2013.01); *A47J 43/0716* (2013.01); *A47J 2043/0733* (2013.01); *Y02P 90/02* (2015.11)

(58) Field of Classification Search
CPC .... A47J 27/004; A47J 43/046; A47J 43/0716; A47J 2043/0733
See application file for complete search history.

(56) References Cited

U.S. PATENT DOCUMENTS 3,827,345 A * 8/1974 Willson ................ G04C 23/16
                                                        99/325
4,503,502 A * 3/1985 Chapin .................... A47J 27/14
                                                        700/90

(Continued)

FOREIGN PATENT DOCUMENTS

| CN | 104519774 A | 4/2015 |
|---|---|---|
| DE | 102013106691 A1 | 1/2014 |

(Continued)

OTHER PUBLICATIONS

Examination Report for Australian Patent Application No. 2017276748, dated Oct. 2, 2019, 3 pages.

(Continued)

*Primary Examiner* — Steven N Leff
(74) *Attorney, Agent, or Firm* — Rudy J. Ng; Bret E. Field; Bozicevic, Field & Francis LLP

(57) ABSTRACT

The invention relates to a method (100) for operating a food processor (10), in which, in a preparation mode, at least one processor device (50) of said food processor (10) is actuated so as to prepare food at least partly automatically, wherein a monitoring device (200) determines detection values (106) by detecting (105), at said processor (10), at least two detection variables (102) specific to a state of preparation.

16 Claims, 4 Drawing Sheets

(56) References Cited

U.S. PATENT DOCUMENTS

| | | | | |
|---|---|---|---|---|
| 4,636,949 | A * | 1/1987 | Longabaugh | G05B 19/042 |
| | | | | 219/442 |
| 5,380,086 | A * | 1/1995 | Dickson | A21C 1/14 |
| | | | | 241/101.2 |
| 5,960,440 | A * | 9/1999 | Brenner | G06F 16/00 |
| 6,486,453 | B1 * | 11/2002 | Bales | H05B 6/6435 |
| | | | | 219/400 |
| 6,609,821 | B2 * | 8/2003 | Wulf | A47J 43/042 |
| | | | | 318/256 |
| 8,136,442 | B2 * | 3/2012 | Strutin-Belinoff | F24C 7/082 |
| | | | | 99/331 |
| 9,057,526 | B2 * | 6/2015 | Barritt | F24C 7/082 |
| 2002/0009016 | A1 * | 1/2002 | Ancona | A47J 36/321 |
| | | | | 366/205 |
| 2005/0193901 | A1 * | 9/2005 | Buehler | A47J 44/00 |
| | | | | 99/468 |
| 2008/0274240 | A1 * | 11/2008 | Germouni | G05B 13/028 |
| | | | | 426/231 |
| 2009/0236335 | A1 * | 9/2009 | Ben-Shmuel | H05B 6/6402 |
| | | | | 219/710 |
| 2009/0258332 | A1 * | 10/2009 | Do | G09B 21/003 |
| | | | | 434/127 |
| 2010/0213187 | A1 * | 8/2010 | Bandholz | H05B 6/6441 |
| | | | | 219/506 |
| 2013/0168475 | A1 * | 7/2013 | Bohannon, Jr. | A23G 9/045 |
| | | | | 241/27 |
| 2013/0171304 | A1 * | 7/2013 | Huntley | G06Q 50/00 |
| | | | | 426/231 |
| 2015/0056344 | A1 * | 2/2015 | Luckhardt | G06F 16/5838 |
| | | | | 426/233 |
| 2015/0164281 | A1 | 6/2015 | Koetz et al. | |
| 2015/0305566 | A1 * | 10/2015 | Koetz | A47J 43/07 |
| | | | | 366/145 |

FOREIGN PATENT DOCUMENTS

| | | | |
|---|---|---|---|
| WO | WO2014016117 A1 | 1/2014 | |
| WO | WO-2014083029 A1 * | 6/2014 | A47J 43/0761 |
| WO | WO2016016337 A1 | 2/2016 | |
| WO | WO2016142405 A1 | 9/2016 | |

OTHER PUBLICATIONS

First Office Action for Chinese Application No. 201780028434.4 dated Apr. 23, 2021, with its English translation, 26 pages.
Office Action for European Application No. 17732800.2 dated Jun. 17, 2021, with its English summary, 5 pages.
Office Action dated Dec. 3, 2021, for Chinese Patent Application No. 201780028434.4, and its English summary, 18 pages.
Office Action for Chinese Application No. 201780028434.4 dated Dec. 23, 2022, with its English translation, 7 pages.

* cited by examiner

METHOD FOR OPERATING A FOOD PROCESSOR

CROSS-REFERENCE TO RELATED APPLICATIONS

This application is a National Phase Application of PCT International Application No. PCT/EP2017/063990, International Filing Date, Jun. 8, 2017, claiming priority to German Patent Application No. 102016110710.7, filed Jun. 10, 2016, each of which is hereby incorporated by reference in its entirety.

The present invention relates to a method for operating a food processor. Furthermore, the invention relates to a food processor according, as well as to a computer program product.

Food processors that can prepare food in an at least partially automatic manner are known from the prior art. A food processor of this kind is disclosed for example in DE 10 2013 106 691 A1, the entire disclosure of which document is incorporated in this application.

A food processor of this kind comprises one or more processing devices which comprise a mixer for example. In this case the processing device can be controlled such that autonomous and/or at least partially automatic preparation is possible. This also comprises in particular the execution of recipe steps by means of the food processor.

In this case, the at least partially automatic preparation takes place in particular in accordance with programming of the food processor. The programming comprises for example specifications, such as control parameters, which are defined depending on recipe steps and/or the user setting. It is furthermore conceivable for the specifications to be adjusted depending on the food that is to be prepared. For example, preparing rice requires a different mixer speed and a different temporal mixing duration than preparing cream. The type of food is specified for example by the recipe or by the user of the food processor and set accordingly on the food processor. Depending on the type of food, the preparation is then carried out in accordance with a specified mixing duration and/or mixer speed that is optimal for preparing the food in question.

However, it is often problematic in this case that the optimal preparation and therefore the optimal values for the control parameters, such as the mixer speed and/or the mixing duration, are dependent on and influenced by a very large number of factors. Factors of this kind are for example the food characteristics (amount, percentage fat, manufacturer and the like) and/or the environmental conditions (such as the room temperature). In order to determine the optimal values for the control parameters it is therefore often not sufficient to use pre-stored values for the control parameters that were set depending on the food type, i.e. in a food-dependent manner. In particular, it is then often not possible to achieve good and comparable preparation results in the case of different requirements and environmental conditions. In this case, it is often not sufficient to take into account merely isolated factors, the costs and technical outlay for the sensor technology also being high.

An object of the present invention is therefore that of overcoming the above-described disadvantages at least in part. The object of the present invention is in particular that of allowing improved and/or simplified, at least partially automatic preparation of food. Furthermore, in particular a preparation by means of the food processor for a food intended for preparation, i.e. in particular identifying and/or defining the optimal control parameters for the food in question, shall be improved with respect to the state and/or the type of the food. In this case in particular the constructive complexity and/or the costs should be reduced.

The above object is achieved by a method as described herein, a food processor having the features as described herein, and a computer program product having the features as described herein. Further features and details of the invention can be found in the relevant dependent claims, the description and the drawings. In this case, features and details that are described in connection with the method according to the invention of course also apply in connection with the food processor according to the invention and the computer program product according to the invention, and vice versa in each case, and therefore, with regard to the disclosure, reciprocal reference is always/can always be made to the individual aspects of the invention.

The object is achieved in particular by a method for operating a food processor, wherein at least one processing device of the food processor is controlled, in a preparation mode, so as to least partially automatically prepare at least one food and/or different foods. The control is carried out for example by means of a control device and/or by means of a control signal which is emitted by the control device and/or by a processing device. In particular, the control signal influences control parameters of the preparation, such that the control parameters, for example the mixer speed and/or mixing duration, can be determined preferably by the control device. Preferably, a monitoring device is provided, which performs an identification of acquisition values by means of acquiring at least two acquisition variables on the food processor that are specific to a preparation state. Preferably, the food processor comprises the monitoring device which, in particular at least during preparation mode, performs the identification of the acquisition values (by means of acquisition) as acquisition values that temporally follow one another in each case, wherein particularly preferably the acquisition values are specific to at least one preparation parameter of the food processor and/or for a preparation state of the food.

It can be provided here in particular that at least one of the following steps is carried out and/or the following steps are carried out (e.g. temporally) in succession or in any order:

a) identifying at least one first acquisition value, e.g. a current measuring value, by a first acquisition, in particular by a first sensor, of a first acquisition variable, b) identifying at least one second acquisition value, e.g. a temperature measuring value, by a second acquisition, in particular by a second sensor, of a second acquisition variable, wherein in particular the second acquisition variable differs from the first acquisition variable, preferably with respect to the type of the acquisition variable (e.g. current intensity and temperature)

c) determining at least one analysis information on the basis of the first acquisition value and/or the second acquisition value, d) performing a time-dependent analysis of the analysis information in order to determine an analysis result specific to the preparation state, e) emitting at least one control signal for influencing the preparation mode, in particular of the control parameters, on the basis of the analysis result, such that the preparation state is taken into account during the preparation.

In other words, on the basis of the acquisition of the acquisition variables, and the analysis result that is dependent thereon, the preparation state can be taken into account during the preparation, i.e. in particular also temporally during the preparation (e.g. during the mixing and/or the operation of the mixer in preparation mode). In this case it is preferably also possible for more than two acquisition variables, e.g. at least 3 or at least 4 or at least 5 or at least 6 or at least 10 or at least 20 different acquisition variables, to be acquired, in particular during a single preparation mode. Preferably, (all) the acquired acquisition variables, such as the first and second acquisition variable, differ from one another with respect to their type, such that for example a first acquisition variable can be in the form of a motor signal (i.e. for example intensity such as current intensity of the motor signal) or the like and a second acquisition variable can be in the form of a temperature or the like. Furthermore, it can also be provided that the first acquisition variable influences a variable (directly) on the food and/or is directly influenced by the food (such as the motor current intensity), and in particular the second acquisition variable is a variable of the surroundings of the food processor and/or the food and/or is a variable influenced by the said surroundings. It may also be possible for the number and/or type of the acquired acquisition variables to be defined on the basis of the (set) food to be prepared, e.g. by means of a processing device of the food processor, and/or on the basis of user input and/or a comparison specification and/or an acquisition variable selection. The preparation can thus be significantly improved.

The time-dependent analysis preferably evaluates a plurality, in particular at least 2 and/or at least 4 and/or at least 10, of the identified acquisition values and/or the identified first acquisition value and/or the identified second acquisition values (and/or the values resulting therefrom in each case, as features generated therefrom in each case), e.g. compares said values with one another, in order to preferably determine (just) one analysis result. An exact knowledge of the factors such as the food characteristics and environmental conditions is thus not necessary, because in particular the analysis result provides the necessary information in order to optimize the preparation. The preparation can then be controlled preferably on the basis of the analysis result, i.e. the preparation mode and/or the control parameters can be influenced so as to ensure the optimal preparation for the food.

For example, a control parameter such as the temporal mixing duration and/or the mixer speed is influenced and/or defined by the emission of the control signal. It is thus possible to determine the optimal control parameters and/or to influence the preparation accordingly on the basis of the food (to be prepared) that is provided for the preparation. The control signal is emitted for example by a processing device and/or by the monitoring device and/or by a control device and/or by an electronics of the food processor. It is furthermore possible, for example, for the determination of the analysis information and/or the analysis and/or the determination of the analysis result to be performed by the processing device, preferably by means of arithmetic operations and/or signal processing.

Furthermore, it is in particular conceivable for the analysis result, which is specific for the preparation state, i.e. in particular for the state of the food during the preparation, to be determined by means of time-dependent analysis. For example a characteristic of the food, such as the consistency and/or temperature and/or optical characteristics and/or acoustic characteristics is understood as a state of the food during the preparation, which characteristics change during the preparation (i.e. during preparation mode). In this case, the analysis information and/or the acquisition values and/or the preparation parameter is/are preferably dependent on the acquisition variables at the food processor, e.g. control variables and/or influencing variables and/or characteristics of the food processor and/or physical variables which are influenced by the state of the food.

Within the context of the invention, the term "acquisition value" preferably refers to a value that can be acquired (for example by means of a sensor) and/or measurement value of the acquisition variable, i.e. in particular a physical variable or measurement variable which is acquired in particular at the food processor, wherein the preparation parameter preferably is or influences the acquisition variable. The identification of the acquisition values in particular comprises a measuring (acquiring) of the acquisition variable, wherein it is possible, in this context, for "a measuring" to be understood both as quantitative and as qualitative acquisition and therefore not necessarily needing to comprise defining a unit and/or quantitative statement regarding the acquisition variable. The acquisition value may for example merely be a voltage value and/or a current value, wherein for example a curve being analyzed by means of the time-dependent analysis and/or consulted for the analysis information, without specific comparison with a unit. In this case, the acquisition value is for example proportional to and/or can be clearly associated with the actual value of the acquisition variable.

Within the context of the invention, the acquisition variable and/or the preparation parameter in particular denotes an acquirable (measurable) physical variable (such as the speed of the mixer) and/or a control variable (such as the motor signal) and/or influencing variable (such as the temperature) at the food processor, wherein the acquisition variable and/or the preparation parameter preferably being (exclusively) indirectly influenced by the preparation state, such as the motor current of an electrical motor for driving the mixer. For example, a change in the consistency of the food brings about a changed (mixing) resistance on the mixer and thus indirectly influences the motor current. The time curve of the measurement values or acquisition values is thus preferably dependent on a curve of the mixing resistance of the mixer. This has surprisingly resulted in the advantage that a time-dependent analysis, in particular of the temporally successive acquisition values, can provide the essential information for optimizing the preparation, in particular for controlling the processing device. In particular, a completion time for the food can advantageously be determined on the basis of the time-dependent analysis of the analysis information.

It is in particular conceivable that the analysis is carried out based upon the analysis information in such a way that the first acquisition value as well as the second acquisition value, and/or all acquisition values, and thus preferably both the first acquisition variable and the second acquisition variable, and/or at least one further acquisition variable, is considered for the determination of the analysis result, and/or influence the analysis result and thus can in particular optimize it.

For example, a first analysis information is determined from a first acquisition value, and/or a second analysis information is determined from a second acquisition value, wherein e.g. the first analysis information is compared with a first comparison specification and the second analysis information is compared with a second comparison specification. Preferably, a determined result, such as a positive decision result, is emitted and/or determined and/or the control signal is emitted and/or determined only in the event that both comparisons are positive. In other words, both acquisition values have an influence on the (overall) analysis result. It can also be possible that if multiple acquisition values of multiple acquisition variables are determined, that all acquisition values and/or acquisition variables have an influence on the acquisition result, and/or are correlated by the analysis, in order to improve in particular the preparation thereby.

According to another advantage, it can be provided that the first and/or second and/or all determined acquisition values, in particular in the time-dependent analysis, are at least partially compared and/or combined and/or correlated with one another. This can, for example, be effected in that the acquisition values are put into relation with one another by arithmetic operations and/or the analysis result depends on each of the acquisition values. This makes a significant improvement of the significance of the analysis result for the influencing of the preparation possible.

Furthermore, it can be provided in the context of the invention that the first and/or the second acquisition variable respectively comprise variables measurable physically on the food processor, which influence a property of the food that can be changed by the preparation respectively in a different manner, and/or are influenced by this property, so that they are in particular specific to a preparation state, wherein preferably the first acquisition variable and/or the second acquisition variable and/or each (all) acquisition variables influence this changeable property of the food respectively in a different manner, or are influenced by the property in a different manner. Preferably, the first acquisition variable is a signal, e.g. a motor current of a motor of a drive for the processing device, and/or the second acquisition variable is a temperature of the prepared food. For example, some or all of the acquisition variables can directly or indirectly depend on a mixing resistance of the mixer of the food processor. Furthermore, it can be possible that at least one of the acquired acquisition variables depends directly or indirectly on a state of the food to be prepared, in particular during the preparation mode. In this way, conclusions can be made to the state of the food by based upon for example, the acquisition values.

Furthermore, it can provided in the context of the invention that the acquisition variables each comprise at least one of the following variables, in particular preparation parameters, and/or each are at least one of the following variables and/or are influenced thereby:
 a rotary speed of the processing device, preferably of a mixer of the food processor,
 a parameter of a drive, preferably of a motor of the drive, e.g. a torque,
 a motor signal, preferably a motor current, which depends upon a torque of the mixer of the food processor,
 a temperature, which in particular is acquired on the prepared food by a temperature sensor integrated in the food processor,
 a core temperature of the prepared food,
 a surface temperature of the prepared food,
 a weight of the prepared food, wherein the weight is acquired by a scales integrated in the food processor,
 a measurable parameter on the prepared food, which in particular is specific to a completion time of the prepared food,
 a time duration, preferably a mixing duration of the mixer, in particular since the time of activation of the preparation mode,
 a brightness, which is acquired, for example, by an optical sensor on the prepared food,
 a noise level, which in particular is acquired on the prepared food by an acoustic sensor,
 a consistency of the prepared food,
 an electric property of the prepared food, preferably of the electric resistance of the food,
 an odorous substance concentration on the prepared food and/or of the prepared food, preferably inside a mixing vessel of the food processor,
 a gustatory substance concentration on the prepared food and/or the prepared food, preferably inside the mixing vessel of the food processor,
 at least one chemical variable of the prepared food, in particular a pH value and/or a concentration of the prepared food,
 a pressure in the region of the prepared food and/or a pressure curve, preferably in a mixing vessel of the food processor,
 at least one spectral characteristic of the prepared food.

In this case, it is conceivable that the acquisition variable is acquired before and/or upon and/or after the preparation mode on the food. In particular, it is conceivable that an electronic database is provided, which includes e.g. comparison values for the respective acquisition variables, in order to evaluate the acquisition values in particular based upon these comparison values. In this way, for example based upon statistical methods, a plurality of acquisition variables can be put into relation with one another for the optimization of the preparation.

Furthermore, it can be provided in the context of the invention that the analysis information includes at least the first and/or the second acquisition value and/or further acquisition values, wherein the further acquisition values are identified by a further acquisition of a further acquisition variable and/or property of the food, wherein e.g. the property of the food and/or the acquisition variable and/or the comparison specification includes at least one of the following properties/variables/specifications:
 an optical image of the food,
 an acoustic record of the preparation of the food in the preparation mode,
 a smell, which is acquires by a sensor on the food,
 a taste, which is acquired by a sensor on the food.

It is naturally also conceivable that a single acquisition value is identified in that and/or a single acquisition variable is acquired in that at least two or more sensors are evaluated (e.g. simultaneously). The use of a compound of multiple sensors makes a significant increase of quality of the preparation possible.

Moreover, it is conceivable that in the preparation mode, first acquisition values are identified periodically and/or repeatedly, and preferably parallel with it, i.e. for example within the same period of time or in the same cycle and/or essentially simultaneously, second acquisition values and/or further acquisition values are identified periodically and/or repeatedly in the preparation mode, wherein preferably the analysis information is determined from the temporal course of the respective periodic or cyclic or repeatedly identified acquisition values, i.e. in particular from a first course of the first acquisition values and/or from a second course of the second acquisition values and/or at least one further course of the further acquisition values. Preferably, the temporal course is determined in that first and/or second and/or further acquisition values are identified periodically and/or repeatedly and/or (temporarily) stored. Particularly preferably, it can be provided that the analysis includes a time-dependent analysis, in particular a time series analysis of the temporal course or curve of the respective acquisition values. To that end, the acquisition values and/or the analysis information and/or the course is/are preferably temporally buffered, wherein preferably the time analysis is carried out in a real-time capable manner, in order to thereby be able to influence the preparation reliably and on time.

Advantageously, it can be provided in the context of the invention that the (first or) second acquisition value is identified outside the preparation mode, preferably prior to the start of preparation, in order to in particular influence the subsequent performing and/or a subsequent evaluation of the time-dependent analysis, in particular during the preparation mode, for the determination of the analysis result. For example, the start of the preparation mode corresponds to the start of preparation. In particular, the second acquisition variable can be a temperature and/or a weight of the food and/or a type of the food (such as cream or pasta), wherein the type of the food can be acquired and/or estimated by an optical sensor, for example, in order to thus be able to set and/or influence in particular the preparation mode optimally even before the start.

Optionally, it can be provided in the scope of the invention that subsequently and/or simultaneously to the time-dependent analysis, even a further analysis of the analysis information is effected, preferably only after an occurance of a certain event, in particular in the preparation mode and/or outside the preparation mode, preferably after the end of the preparation mode, in order to determine the analysis result, wherein the further analysis differs from the time-dependent analysis. For example, it can be reasonable to carry out an analysis, as from a certain (critical) timepoint of the preparation mode, which is faster than the time-dependent analysis, in order to deal with a time-critical change of the food in the preparation.

Another advantage can be achieved in the context of the invention in that the preparation state is as a future optimal completion timepoint of the prepared food during the preparation, wherein the control signal can be emitted temporally in such a way, e.g. by taking a latency into account, that a deactivation of the preparation mode at the completion timepoint is caused, wherein preferably the time duration until reaching the completion timepoint is determined by a calculation and/or prediction by means of the time-dependent analysis. In particular, the analysis and/or acquisition of all acquisition variables serves e.g. exclusively to determine the optimal completion timepoint during the preparation. It can alternatively or additionally likewise be possible that the acquisition of the acquisition variables and/or the analysis also serve to influence the preparation parameters during e.g. the entire preparation mode, in order to optimize des preparation.

Furthermore, it can be of advantage in the context of the invention if a first and a second control signal is emitted, wherein the first control signal is emitted when a first analysis result is determined, so that the preparation in influenced in a first manner, preferably by reducing the rotary speed of a mixer of the food processor in a time-critical region of the time-dependent analysis, and/or the second control signal is emitted when a second analysis result is determined so that the preparation is influenced in a second manner, which is different from the first manner, in particular by a stop of the preparation mode. In particular, it can be possible that the first and/or the second control signal is emitted only in the event that a certain type of food is prepared. As a result, this particularly achieves the advantage that an extension of the preparation duration can be achieved by reducing the rotary speed in the time-critical range, and thereby a more time-consuming analysis can be conducted. In this case, in particular the first analysis result is specific to the presence and/or occurence of the time-critical range, and/or the second analysis result is specific to the future occurence of the optimal completion timepoint.

Furthermore, it is conceivable that the first and/or the second acquisition variable and/or the comparison specification is a surroundings parameter outside the food processor, preferably a spatial and/or geographical and/or local position of the food processor, in particular in the form of a GPS coordinate of the food processor, in order to adapt the preparation e.g. to geographical differences, an information about the food and/or the preparation of the food, which is stored externally of the food processor, preferably in a (e.g. electronic) database, in order to preferably be retrieved via a network and/or in a cloud-based manner (i.e. e.g. from a remote computer via a network and/or via the Internet), a product information of the food, in particular about producer-related properties and/or the ingredients and/or about the eat-by date, which is e.g. identifiable by the scanning of a barcode and/or other label, and/or is input manually by the user and/or retrieved from the database, an air pressure outside the food processor, an air humidity outside the food processor, a temperature outside the food processor (e.g. temperature of the surroundings), a time and/or a day time and/or a date, which is identifiable e.g. via the database and/or a further database, wherein preferably the first acquisition variable is a parameter of the preparation surroundings (e.g. inside the mixing vessel) within the food processor.

Furthermore, it can optionally be provided that the analysis or determination of the analysis result, in particular by the time-dependent analysis and/or by a further analysis and/or by a further analysis or evaluation, is carried out in an adaptive manner (e.g. using artificial intelligence), preferably in such a way that the analysis result and/or a quality result of the preparation is stored and/or is employed for a future determination of the analysis result of a future preparation, wherein preferably the quality result depends upon the analysis result and/or on the first and/or second acquisition and/or on a further acquisition of a further acquisition variable. This provides the advantage that the preparation and/or analysis can be continuously improved as the number of conducted preparation and/or analyses increases.

In addition, it can be possible in the context of the invention that the analysis or the determination of the analysis result is effected dependent upon a parameterization, wherein preferably the parameterization occurs prior to the activation of the preparation mode based upon a user-dependent adaption, in particular by information from a database. In particular, by the parameterization, an adaption of the analysis can be effected in such a way that the type of the analysis and/or parameter of the analysis, and/or the acquisition variables considered for the analysis or acquisition variables can be determined thereby. In particular, the selection of a comparison specification can also be determined by the parameterization. The analysis can be used versatilely for different food types, as a result.

It can further be possible that in the time-dependent analysis, at least one comparison specification is evaluated dependent upon a prepared food, wherein, preferably for the calculation and/or prediction of a future determined state, in particular completion timepoint, an comparison of the analysis information with the comparison specification is effected directly or indirectly, wherein preferable at least a temporal analysis curve of the analysis information is compared with at least one temporal course pattern of the comparison specification. In this case, it is also conceivable that the analysis information is intermediately analyzed first, e.g. by a filtering and/or feature generation, and the intermediate result of the intermediate analysis is compared with the comparison specification, in order to determine the analysis result. Preferably the comparison specification is retrieved dependent upon the food, i.e. in particular of the type of the prepared food, e.g. from a database. The database can therefore include different comparison specifications for different foods, in order to make a versatile use of the food processor possible. In particular, the temporal analysis curve of the analysis information is determined dependent upon the temporal course of the respective acquisition values.

Furthermore, it can be provided that the following steps are provided, preferably prior to step d) and/or after step b)
setting and/or selecting a food to be prepared by a user input on the food processor,
selecting a comparison specification dependent upon the set food.

Furthermore, it can be particularly provided that as a further step, preferably after step c) and/or prior to step 3) and/or during step d), is provided, that a comparing of values of the analysis information and/or of the analysis result with the comparison specification is effected, in order to determine in particular a future state specific to the food. This allows a versatile use of the method according to the invention for different foods.

Furthermore, it is conceivable that a selection of the comparison specification is effected in such a way that the comparison specification is read out from a database dependent upon a set food, wherein preferably the database is provided locally and/or in a cloud-based manner via a network and/or Internet by a computer remote from the food processor (e.g. geographically remote) and/or by means of a mobile data storage unit. A mobile data storage unit also concerns a USB memory stick, and/or another portable data memory that can be used e.g. in the food processor and/or can be connected with the food processor. Thus, new comparison specifications for the food processor can be provided in a flexible manner. In particular, the comparison specification can be selected e.g. dependent upon food pre-set and/or provided for preparation, and/or be selected dependent upon a recipe (i.e. e.g. dependent upon a digitally stored recipe for the automatic preparation of the food). In this case, the database is e.g. an electronic data processing system, preferably software-based. In particular, it can be provided here that the selection of the comparison specification is effected during the processing of a recipe, e.g. at a certain point of the recipe.

Furthermore, it is conceivable that a positive or negative decision result is determined dependent upon the analysis result, wherein in particular the positive decision result is determined only in the event that the analysis result indicates a future determined preparation state, and wherein preferably the control signal is emitted only in the event that the determined decision result is positive. Furthermore, it is conceivable that, in the analysis, the filtered first acquisition value and/or the filtered second acquisition value and/or a generated feature is compared with a comparison specification, in order to determine e.g. the analysis result. The generated feature is e.g. identified by an evaluation and/or feature generation, e.g. based upon the acquisition values and/or based upon the acquired course. Furthermore, an analysis can e.g. also include filtering methods, which are e.g. employed for smoothing of the detecting curve of the acquisition values.

Particularly preferably, it can be provided that the processing device, which preferably comprises a mixer, in the preparation mode, is controlled to at least partially-automatically prepare various foodstuffs, in particular whipped cream and/or pasta and/or rice, wherein at least one food-specific comparison specification is provided and/or pre-stored for each of these foods. Alternatively or additionally, it can be provided that a comparison specification includes an information about an acquisition variable selection, wherein the comparison specification is selected e.g. dependent upon the set food, and (only) the acquisition variables are acquired during the acquisition that are predetermined by the acquisition variable selection of the selected comparison specification, so that in particular when selecting a first prepared food, at least one different acquisition variable is acquired than with a selection of a second prepared food. In this case, in particular the acquisition variable selection also serves for a parameterization of the analysis. Preferably, the comparison specification with the acquisition variable selection and/or only the acquisition variable selection can be read out from an (e.g. electronic) database. This allows a flexible use of different foods.

The invention also relates to a food processor with at least one processing device and/or a monitoring device, wherein in a preparation mode, the processing device can be controlled to at least partially-automatically prepare food, and wherein the monitoring device comprises at least two sensors, and at least a first acquisition value can be identified by a first sensor by means of a first acquisition of a first acquisition variable of the food processor and in particular by a second sensor at least a second acquisition value can be identified by means of a second acquisition of a second acquisition variable of the food processor, wherein the second acquisition variable differs from the first acquisition variable. It is provided here that the monitoring device includes a processing device, and by the processing device at least one analysis information can be determined dependent upon the first acquisition value and/or the second acquisition value, and a time-dependent analysis of the analysis information for determining an analysis result specific to a preparation state can be performed (by the processing device, for example), wherein at least one control signal can be emitted, on the basis of the analysis result, for influencing the preparation mode. This way, the food processor according to the invention comes with the same advantages as have already be described in detail for a method according to the invention. In addition, the food processor according to the invention can be suitable to be operated and/or to be operable according to a method according to the invention.

Furthermore, it can be provided in the scope of the invention that the processing device includes at least one drive and/or a processing tool, in particular a mixer of the food processor, which can be operated by the drive, and in preferably the monitoring device is electrically connected to the drive, so that an acquisition of at least one of the acquisition variables can be carried out by the monitoring device. Here, the monitoring can be effected by a sensor of the monitoring device, which is for example arranged in a manner as to be spaced in terms of construction, from the monitoring device (e.g. connected to the monitoring device electrically and/or via radio), for example in the region of the prepared food and/or in the region of the food processor provided to that end. Alternatively or in addition, it is conceivable that the first sensor and/or second sensor respectively perform the acquisition on the food, and are preferably arranged in the region and/or at least in part inside a mixing vessel of the food processor, in order to thereby be able to acquire the acquisition variables in a particularly reliable manner.

In addition, it can be provided that the food processor comprises a mixing vessel for accommodating the food, wherein in particular the mixing vessel is in the form of a thermo vessel to maintain the temperature of the food and/or is configured with a double wall. For example, the first and/or the second and/or another sensor can be provided and/or be arranged in the region of the mixing vessel in such a way, that a temperature inside the mixing vessel can be identified by the sensor and/or by the acquisition of the acquisition variables. This way, the temperature can be maintained and/or monitored, for example.

It is furthermore conceivable that the (first and/or second and/or another) sensor is integrated a mixing vessel of the food processor, and preferably performs an acquisition of the acquisition variables inside and/or outside the mixing vessel, wherein the mixing vessel preferably can be detachably inserted into a mixing vessel holder of the food processor. As an alternative or in addition, it is also conceivable that the sensor is configured that it can be retrofitted in such a way that the sensor can be fitted, preferably inserted, into the food processor and/or a mixing vessel of the food processor and/or a cover of the mixing vessel in a detachable manner. This way, an existing sensor can be replaced and/or a new sensor can be retrofitted, in order to e.g. be able to perform the method according to the invention for additional foods and/or additional acquisition variables.

Furthermore, it is conceivable within the context of the invention that a mixing vessel holder of the food processor and/or a mixing vessel of the food processor that can be inserted in the mixing vessel holder and/or a and/or a lid of the mixing vessel that can be placed on the mixing vessel comprises at least one electrical contact for establishing an electrical connection to an electrical circuit of the food processor when in the inserted and/or placed-on state, preferably for supplying energy to the sensor and/or for data transmission (e.g. from the sensor to the monitoring device), wherein the electrical contact preferably is electrically connected to the sensor, in particular both in the inserted and/or placed-on state, and when not in the inserted and/or placed-on state. This allows to perform a reliable monitoring of the food, in particular by acquiring the acquisition variables by the sensor. In this case, the sensor is, for example, the first sensor and/or the second sensor and/or another sensor.

The time-dependent analysis is preferably an analysis of temporally successive (acquisition) values, preferably a time series. The time-dependent analysis particularly preferably comprises statistical methods for predicting the future development of the time series and/or acquisition values and/or the acquisition variables. In this case, a prediction provides the advantage that the control signal can be emitted in due time, despite a long latency period, i.e. a delay between the preparation state occurring and the corresponding analysis result being provided. The time-dependent analysis therefore provides the advantage that a future completion and/or other desired state in the preparation of the food can be identified or determined reliably and early. This makes it possible to influence the preparation early on, in order to be able to deactivate the preparation mode in due time for example. In other words, the control signal is preferably used to maintain a preparation state which temporally follows the preparation state for which the particular analysis result is specific. The time-dependent analysis, which is also performed in a time-limited and/or real-time capable manner for example, can thus perform and/or initiate the influencing of the preparation mode and/or the determination of the preparation state and/or the prediction of the desired completion time before the completion time has been temporally reached and/or exceeded.

It is furthermore conceivable for the food processor to comprise at least one and/or at least two and/or at least three and/or more processing devices which preferably each comprise at least one processing tool, preferably at least one mixer and/or at least one heating element. In particular, each processing device can comprise one sensor, respectively, the sensors for example differing from one another in each case, for example in order for it to be possible to identify a different acquisition variable in each case. It may furthermore be possible for the processing device to comprise at least one electric motor (e.g. electromotor), preferably for operating the mixer. In addition, the processing device can preferably comprise at least one temperature sensor and/or at least one scale and/or at least one current sensor and/or at least one voltage sensor, wherein it also is possible for the processing devices to be designed differently from one another in each case. For example, a first processing device is provided which comprises the mixer, and a second processing device is provided which in particular comprises the heating element and/or the temperature sensor. Furthermore, the food processor preferably comprises a housing which comprises a holder for a mixing vessel. The mixing vessel can for example be closed by a lid and in particular comprises a handle. The food to be prepared can in particular be poured into and/or received in the mixing vessel. The mixer and/or the heating element are preferably arranged in the inside of the mixing vessel, and can in particular act on the food in the mixing vessel. It may also be possible for the food processor to comprise at least one control panel which preferably comprises at least one display, preferably a touchscreen. In this place, the display is used for example as an input and/or output means for a user of the food processor. Further input means such as a rotary control and/or a Set switch and/or the like may optionally also be provided. A user of the food processor can set and/or activate and/or deactivate for example control parameters and/or operating parameters, such as the mixer speed and/or the heating temperature and/or the time period for the mixing process (mixing duration) and/or different programs for the preparation by means of the control panel, in particular by means of the display in conjunction with the further input means. It is also conceivable for the control panel and/or the food processor to be designed such that the operating parameter to be set and/or a recipe selection can be selected using the touchscreen and/or such that the value for the selected operating parameter and/or a specific recipe can be set/selected using the further input means.

It is furthermore possible in particular for the user to be able to set the food (i.e. in particular the type of food) and/or the preparation and/or the recipe for the food processor by means of the control panel. It may furthermore be possible for the user to be able to activate and/or deactivate the preparation mode of the food processor, in particular using the control panel and/or the further input means. In preparation mode, for example the mixer and/or a motor for operating the mixer is started, preferably for a specified temporal mixing duration. The preparation mode for example can be deactivated at the latest following said specified mixing duration, as a result of which the operation of the mixer and/or of the motor is also ended. Preferably, when the preparation mode is activated the mixer speed is greater than 0 and when the preparation mode is deactivated the mixer speed is 0. In this case, the deactivation of the preparation mode and/or the setting of preparation parameters and/or operating parameters such as the mixer speed and/or the duration of the mixing process can take place for example manually and/or (partially) automatically, for example in a program-controlled and/or recipe-dependent manner (for example on the basis of the recipe selected) and/or in a food-dependent manner (e.g. on the basis of the state of the food). This thus in particular allows for the at least partially automatic preparation of the food.

It is furthermore conceivable for the acquisition variable and/or the preparation parameter (and/or the control parameter) to correspond to the operating parameter and/or to comprise the operating parameter, and/or for the acquisition variable and/or the acquisition value to be dependent on the operating parameter. Each recipe and/or each food that is set preferably comprises at least one (digitally stored) program for the preparation process.

Preferably, the food processor and/or a mobile device (such as a mobile memory or recipe chip) for the food processor comprises a non-volatile memory unit in which preparation parameters and/or a comparison specification and/or an acquisition variable selection and/or pre-set operating parameters and/or programs and/or recipes are stored, which are selected for example on the basis of input by the user. In this case, said operating parameters in particular also comprise control parameters, for example the mixer speed and/or the values for electrical parameters for controlling the motor of the mixer, in order to achieve a specified mixer speed. In this case, the preparation parameters preferably comprise the operating parameters and/or control parameters and/or further parameters at least in part, which parameters are relevant for the preparation. In particular, the preparation parameters each comprise information regarding, for example:
  properties of the food processor and/or the control and/or acquisition variables and/or physical variables that are relevant for the preparation of the food and/or that are dependent on a preparation state,
  the type of the acquisition variables to be acquired, for example a motor signal of the motor of the mixer, which is in particular dependent on the control of the motor and/or on the speed and/or the torque of the mixer,
  the number of acquisition variables to be acquired.

Within the context of the invention, the preparation state is to be understood as the state of the food during preparation and/or characteristics of the food, such as an optimal future completion time of the preparation and/or of the food. The analysis result is therefore preferably specific for the preparation state, i.e. the analysis result in particular makes it possible to conclude the state of the prepared food at the timepoint the measurement values were identified and/or how the preparation can be influenced in order to achieve an optimal result.

For example, a completion time for the preparation can be estimated on the basis of the analysis result and the duration of the mixing process can thus be adjusted and/or the mixer speed can be adjusted. The speed may for example be and/or vary in a range of from 10 rotations per minute (rpm) to 600 rpm, preferably between 40 rpm and 500 rpm. The mixing duration can for example be set in a range between 10 seconds and 1000 seconds, preferably 20 seconds to 400 seconds. This allows for the optimal preparation of a plurality of different foods.

It may in particular be provided for the preparation to be performed on the basis of input by a user of the food processor and/or programming of the food processor. In this case, it is conceivable for example for the user to set on and/or input into the food processor the type of food that is to be prepared. This may for example also take place by means of the user selecting a particular recipe. Subsequently, it may be possible for a particular comparison model and/or a particular acquisition variable selection and/or a particular program and/or particular values for operating parameter and/or control parameters for the at least partially automatic preparation by the food processor to be loaded and/or set and/or read out on the basis of the food type. In particular, at least one specification, such as the type and/or the number and/or the selection of the acquisition variables to be acquired, can also be determined, directly or indirectly, by means of selecting the recipe and/or by means of the user input and/or on the basis of the food type. For this purpose, the specifications and/or programs and/or values are for example stored digitally in a non-volatile memory unit, in particular of the food processor and/or of a mobile device. This can make it possible to program the food processor in a flexible manner for different food types.

In this case, the food and/or the food type is for example cream and/or rice and/or flour, and therefore for example a first food, in particular cream, and/or a second food, in particular rice, can be provided for the preparation and/or according to the programming. Different time-dependent analyses and/or different parameterization for the time-dependent analysis can also be used, depending on the type of food. It may also be possible for different acquisition variables to be acquired and/or for characteristic curves of the analysis information and/or of the analysis result to be specified and/or to be able to be read out and/or compared on the basis of a food selected by the user, said variables and/or curves being specific for the particular food in each case. It is thus possible, for example, for a first curve of the analysis information or of the analysis result to be provided and/or evaluable for a first food, said first curve being characteristic of said first food, and for a second curve of the analysis information or of the analysis result to be provided and/or evaluable for a second food, said second curve being characteristic of said second food. Furthermore, it is preferably possible to determine a first selection (i.e. in particular type and/or number) of acquisition variables for a first food and a second selection of acquisition variables for a second food, which variables are intended to be acquired. Moreover, it is preferably possible for the characteristic curve to be determined on the basis of the selection of the acquisition variables. The evaluation of the corresponding characteristic curve, e.g. by comparing the characteristic curve with the identified curve of the measurement values and/or with the analysis result then makes it possible to draw conclusions on the state of the food in question, with the result that, for example on the basis thereof, the control signal is emitted, for example as a binary and/or electronic signal. For example, in the case of cream, the influence, in particular a deactivation on the preparation mode, is effected when an increasing curve of a motor signal of the mixer is ascertained by the time-dependent analysis and/or on the basis of the analysis result of the time-dependent analysis. In the case of rice, is preferably the influence, in particular a deactivation on the preparation mode, is preferably effected when a falling curve of the motor signal is detected by the time-dependent analysis and/or on the basis of the analysis result of the time-dependent analysis. The advantage of this is that different foods can be optimally prepared in a flexible manner using the time-dependent analysis.

It is furthermore possible that a filtering of the identified acquisition values, in particular the first and/or second and/or further acquisition values, to be performed, preferably in order to generate features. In this case it is possible in particular for at least one of the following filtering methods to be carried out individually or in combination (directly or indirectly) on the identified acquisition values (in particular measurement values) in order to filter the identified acquisition values, in particular an acquisition value curve of the temporally successive acquisition values:
  median filter
  moving average
  first and/or second and/or at least fourth-order low pass filter.

The filtering of the identified acquisition values (i.e. the unfiltered identified acquisition values) is preferably carried out such that filtered identified acquisition values are determined by means of the filtering. In particular, the analysis information is determined on the basis of the filtered identified acquisition values. In this case, the filtering preferably comprises a first filtering process for identified first acquisition values and/or a second filtering process for identified second acquisition value, such that filtered identified first and/or filtered identified second acquisition values are determined by means of the filtering. Particularly preferably, the (first) filtering method of the first filtering process differs from the (second) filtering method of the second filtering process, in particular on the basis of the (type of the) relevant (first and/or second) acquisition variable. This allows for the analysis to be further improved, in particular by reducing the influence of errors and thus optimizing the preparation.

It is furthermore conceivable for filtering of the acquisition values and/or generation of at least one feature to be performed on the basis of the identified acquisition values and/or on the basis of the analysis result. The filtering and/or the generation of the feature and/or the determination of the analysis information and/or the time-dependent analysis preferably comprises a (numerical) determination of a difference and/or of a gradient, and/or a comparison of (e.g. adjacent) filtered and/or unfiltered identified acquisition values (i.e. for example also first and second acquisition values). In this case it is conceivable for the filtering and/or the determination of the analysis information, and/or the generation of the features to be performed on the basis of the time curve of the (e.g. first and/or second) acquisition values, i.e. on the basis of for example at least 2 and/or at least 4 and/or at least 5 and/or at least 10 and/or at least 100 (adjacent, identified first and/or second) acquisition values in each case. It is thus possible to create a reliable information base for the analysis.

The time-dependent analysis preferably evaluates the time curve which may for example comprise first and/or second acquisition values that were each identified in a time interval of more than at least 1 s and/or at least 2 s and/or at least 5 s and/or at least 10 s (by means of the acquisition). In particular, steps of the method according to the invention can be carried out in temporal succession or in any desired sequence and/or repeatedly. In this case, at least one of said steps and/or the filtering and/or the generation of the features (feature generation) can for example be software- and/or computer-implemented and/or performed electronically and/or by means of an electronic, in particular integrated, circuit. It may in particular be possible for digital and/or discrete acquisition values to be evaluated for the filtering and/or time-dependent analysis. Alternatively or in addition it may be possible for the time-dependent analysis and/or at least one of the steps of the method according to the invention to be carried out repeatedly and/or cyclically, in particular over the entire preparation process, in order to determine the analysis result repeatedly and/or cyclically in each case. In particular it may be possible for the time-dependent analysis and/or at least one of the steps of the method according to the invention to be carried out at least once per second and/or at least ten times per second and/or at least one hundred times per second during the preparation mode, i.e. during the preparation. It is furthermore possible, for example, for at least one of the steps of the method according to the invention to be carried out by a processing device at least in part, preferably by means of arithmetic operations and/or a signal processing. In this case, said steps ensure that the preparation of the food can be influenced reliably in order to achieve optimal preparation results.

It is furthermore conceivable for at least one threshold value to be evaluated, in particular in at least one of the steps of the method according to the invention, in particular in order to check the plausibility of the analysis result, preferably at least one comparison value, such as at least one identified and/or filtered (first and/or second) acquisition value and/or at least one generated feature and/or the analysis result and/or a temporal mixing duration being compared with the threshold value. The threshold value can preferably be dependent on the type and/or number of the acquired acquisition variables. The threshold value may for example comprise an upper and a lower threshold value, i.e. a threshold value range defined thereby. For example, it may be provided for a positive decision result to be determined and/or for a control signal for deactivating the preparation mode to be emitted only if the comparison value is less than the upper threshold value and/or greater than the lower threshold value. It is thus for example possible to prevent disadvantages during the preparation on account of ambiguous analysis results.

It is furthermore conceivable for a comparison specification, preferably having a time curve pattern, to be evaluated for the analysis. Alternatively or in addition, a gradient of the acquisition values and/or a time curve of the (filtered or unfiltered) acquisition values (acquisition value curve) and/or averages of the curve and/or the like is also evaluated during the analysis in order to determine the analysis result for example. The comparison specification preferably comprises a specified pattern, in particular a time curve pattern and/or a specified characteristic curve of the analysis information and/or of a frequency distribution. In particular pattern recognition and/or feature generation is used for a comparison with the comparison specification during the analysis. The generation of the features (feature generation) comprises for example a calculation of a temporal difference and/or a variance and/or a trend (for example in relation to a drop or rise in the acquisition value curve).

The food that is prepared and/or to be prepared (i.e. provided for preparation and/or poured into the food processor) can preferably comprise at least one of the following foods, wherein a comparison specification is selected and/or an acquisition variable selection is performed on the basis of the food for example:
  pasta,
  rice,
  whipped cream,
  dough,
  sauces and/or emulsions,
  ice mass.

A first and at least one second threshold value may optionally also be provided, wherein a first threshold value preferably is evaluated for or compared with the first acquisition value, and a second threshold value preferably is evaluated for or compared with the second acquisition value. It is also conceivable for the first and second or alternatively an upper and lower threshold value to be provided, which in particular define a value range. In other words, for example a decision is carried out, i.e. the decision result is determined, and/or a positive decision result is determined and/or taken into account only if the (first and/or second) acquisition value and/or the generated feature is lower than an upper (first) threshold value and/or greater than a lower (first) threshold value. Preferably (as an additional condition), the decision is carried out and/or a positive decision result is determined and/or taken into account only if the mixing duration is less than an upper (second) acquisition value and/or greater than a lower (second) threshold value. As a result, the period of time for carrying out the decision is thus defined by the second threshold value, wherein the threshold values for example are empirically defined and/or are food-dependent (i.e. for example defined on the basis of a food selected and/or set by the user) and/or acquisition variable-dependent (i.e. on the basis of the type of acquisition variable). This makes it possible in particular to assign each of the acquired acquisition variables a specific upper and lower threshold value in each case in order to thus further improve the preparation.

The threshold values are stored in a digitally persistent manner, for example in a non-volatile memory unit such as a ROM (read only memory) or a flash memory, and can be read out for a corresponding food. The mixing duration can for example be identified in that an (electronic) timer is started when the preparation mode is activated and/or when the mixer speed is increased, and/or is read out when the acquisition values are identified and/or during at least one of the steps of the method according to the invention. It is thus possible to reliably check the plausibility of the analysis result. In this case, the first and/or second and/or upper and/or lower threshold value can for example be in a range between 1 second and 5000 seconds, in particular 10 seconds to 1000 seconds, preferably 20 seconds to 400 seconds. The threshold values can preferably be defined empirically in that the (lower) threshold value and/or a (lower) first and/or a (lower) second threshold value specifies the particular value or the mixing duration at which (defined empirically) the desired preparation state (e.g. the desired consistency of the food) occurs at the earliest. Furthermore, the threshold values can preferably be defined empirically in that the (upper) threshold value and/or an (upper) first and/or an (upper) second threshold value specifies the particular value or the mixing duration at which (defined empirically) the desired preparation state (e.g. the desired consistency of the food) occurs at the latest. In addition to the threshold values, in particular also further identified values such as temperature values and/or weight of the food can be evaluated for the plausibility check. In particular, the plausibility check is performed at the latest when a decision is carried out and/or a positive decision result is output only if the plausibility check is positive, i.e. the limits specified by the threshold values are satisfied.

It may be advantageous if, within the context of the invention, the time-dependent analysis comprises a time series analysis, preferably a (statistical) evaluation of the frequency distribution, for this purpose in particular the analysis information and/or the identified acquisition values and/or the frequency distribution are temporally buffered, the time-dependent analysis and/or the time series analysis preferably are performed in a real-time capable manner. The term "real-time capable" preferably refers to the fact that the analysis result is determined by the time-dependent analysis at the latest within a predefined maximum time period. A "soft" or alternatively also "firm" real-time requirement is thus preferably provided in preparation mode in order that the preparation mode can be influenced in due time. According to the soft real-time requirement, the analysis result is processed further or the decision result is positive only if the predefined maximum time period has been adhered to and/or has not been reached. In order to ensure particularly fast processing, temporal buffering is preferably provided, in particular by means of a fast cache memory. The time series analysis for example comprises performing a frequency analysis and/or an autocorrelation function and/or an interference statistical analysis and/or a trend analysis and/or an analysis of a difference or rise in the temporal acquisition value curve.

The monitoring device in particular comprises an acquisition device in order to identify acquisition values and/or to acquire acquisition variables at the drive means for example, and/or to acquire the acquisition variables. For this purpose, the monitoring device can also comprise at least one or more sensors which are integrated in the food processor and/or arranged on the food processor. In this case, the sensor and/or the sensors can be designed for example as temperature sensor and/or voltage sensor and/or current sensor and/or speed sensor and/or torque sensor. Accordingly, the acquisition values are voltage acquisition values and/or current acquisition values and/or torque acquisition values and/or speed acquisition values and/or temperature acquisition values. This is advantageous in that the relevant acquisition values can be identified in a reliable manner.

Preferably, a third sensor for acquiring a third acquisition variable and/or a fourth sensor for acquiring a fourth acquisition variable and/or further sensors for acquiring further acquisition variables is also provided. Preferably, all acquisition values that were identified by means of acquiring all the acquisition variables are used for determining the analysis information, in order that the preparation can be adjusted in a particularly stable and reliable manner by means of consulting as may acquisition variables as possible.

According to a further advantage, it may be possible for the processing device and/or the monitoring device to be integrated in the food processor, and in particular for the acquisition values to be identified directly by means of acquiring the acquisition variables at the processing device inside the food processor. For example, the processing device and/or the monitoring device may be arranged inside a housing (and/or on the housing at least in part) of the food processor and/or may be rigidly connected to further components of the food processor. The relevant acquisition variable can be acquired for example by means of a motor current of a motor of a mixer of the food processor being measured. A voltage tap and/or a shunt resistor for example, in particular as a first sensor, may be provided on an electrical line of a drive means of the food processor in order to acquire for example a first acquisition variable such as the motor current. A second sensor may for example be designed as a temperature probe, in order to acquire a second acquisition variable such as a temperature for example. The advantage of this is that the acquisition values can be identified, and thus a preparation state can be identified, in a simple manner.

It is furthermore conceivable for the monitoring device to comprise an electrical and/or electronic processing device, and/or for the processing device and/or the monitoring device to comprise at least one electronic component. The electronic component for example comprises a microprocessor and/or a digital signal processor and/or a non-volatile memory and/or an application-specific integrated circuit (ASIC) and/or a field-programmable gate array (FPGA) and/or the like. This allows for the time-dependent analysis to be performed in a quick and reliable manner. In particular, the electronic component and/or a sensor that is connected to the monitoring device or integrated therein optionally also comprises an analogue-to-digital converter which is used for acquiring the acquisition variable for example.

The invention also relates to a computer program product for operating a food processor, in particular a food processor according to the invention. In this case, the computer program product is intended to be configured to carry out a method according to the invention. As a result, the computer program product according to the invention provides the same advantages as have been described in detail with reference to a method according to the invention and a food processor according to the invention. In addition, a computer program product according to the invention may also be suitable for being read out and/or executed by a processing device of a food processor according to the invention, in particular in order to carry out the method according to the invention. A computer program product according to the invention is for example firmware which is preferably used for operating the food processor according to the invention and/or can be digitally transferred to the food processor or the memory unit and/or processing device. Furthermore, the computer program product according to the invention may also be configured as a digital storage medium, in particular as a flash memory and/or a digital optical storage medium such as a CD and/or DVD and/or Blu-ray.

It may furthermore be possible, within the context of the invention, for a preparation recording of the preparation to be made or created (in particular by means of the monitoring device), at least during the preparation mode and/or in the case of preparation (of or during the preparation mode) that is to be recorded. For this purpose, further acquisition values and/or further recordings of the prepared food and/or at least one control value and/or at least one result value are identified (during the preparation) (for example repeatedly and/or cyclically and/or as a one-off). The at least one control value is identified for example by means of acquiring acquisition values of at least one control parameter, the control parameter being specific for the preparation (to be recorded). The at least one result value is identified for example by means of acquiring result values of at least one result parameter, the result parameter being specific for the result of the preparation and/or for the preparation. Subsequently, the identified control value and/or the identified result value can in particular be recorded in a preparation recording (e.g. in the form of digitally and/or persistently stored information), such that said recording is preferably assigned (in the form of a recorded preparation) to the preparation to be recorded. In this case, the acquisition value comprises for example at least one acquisition value and/or at least one recording of the prepared food. The control parameter comprises for example at least one acquisition variable and/or at least one variable and/or user input and/or the like that is acquired by a sensor of the food processor. The result value in particular comprises at least one acquisition value and/or at least one recording of the prepared food. The result parameter preferably comprises at least one acquisition variable and/or at least one user input and/or at least one variable that is acquired by a sensor of the food processor. In this case, the control parameter and the result parameter particularly preferably differ from one another. This is advantageous in that preparation can be recorded and in particular reproduced at a later timepoint. For this purpose, it is in particular possible for the control parameters, which are used in particular for controlling the preparation, to be acquired as comprehensively and/or completely as possible and to preferably be able to be recorded and/or reproduced by the control values. In this case, the result value and/or the result parameter is used in particular for recording and/or reproducing the result of the recorded preparation, e.g. a state of the prepared food.

In this case, the control parameter is in particular a parameter of the kind, in particular an acquisition variable of the kind, that comprises information regarding the specific preparation, in particular the control of the preparation and/or of a single preparation step of the preparation. The control parameter thus for example comprises information regarding a speed of a mixer of the food processor and/or a direction of rotation (e.g. anti-clockwise or clockwise rotation) of the mixer, and/or regarding a set temperature of a heating element or a heating means of the food processor, and/or regarding a preparation duration, in particular of a single preparation step. For example, when preparing fried onions the control parameter influences the degree of roasting of the onions because for example the temperature for heating the onions and/or the duration of the heating is determined thereby. In this case, the result parameter is preferably specific for the result of the preparation, e.g. the degree of roasting of the onions. The result parameter can therefore be, for example, a visual recording of the food, e.g. by means of a camera sensor, and/or another physical variable of the food processor, e.g. a motor current. For example the consistency of the food, such as whipped cream, can be checked on the basis of the motor current. It is also conceivable for the result parameter to relate to a user input, e.g. for shortening the preparation time. It may be possible, for example, for the preparation time specified by the recipe to be shortened by means of user input when the desired degree of roasting is achieved. Accordingly, the result parameter, for example, may comprise a user-specific adjustment of this kind. It is also conceivable for the result parameter to relate to an adjustment owing to acquired environmental parameters, which adjustment is performed automatically for example, in order to optimize the preparation under different environmental conditions.

It may furthermore be possible that, in order to reproduce the recorded preparation, the preparation recording is first evaluated, in particular when a further preparation mode is initiated for a further preparation, and preferably when a recipe selection is made. Furthermore, a control signal can subsequently be emitted, in particular on the basis of the evaluation and/or of the preparation recording, such that the further preparation takes place in a manner adjusted to the preparation recording. In particular, the result of the recorded preparation and/or at least one preparation step of the recorded preparation and/or a curve of control parameters of the recorded preparation can thus be reproduced.

Further advantages, features and details of the invention can be found in the following description, in which embodiments of the invention are described in detail with reference to the drawings. In this case, the features mentioned in the claims and in the description may in each case be essential to the invention alone or in any desired combination. In the drawings:

In the following drawings, identical reference characters are used for the same technical features, even in different embodiments.

Figure 1:
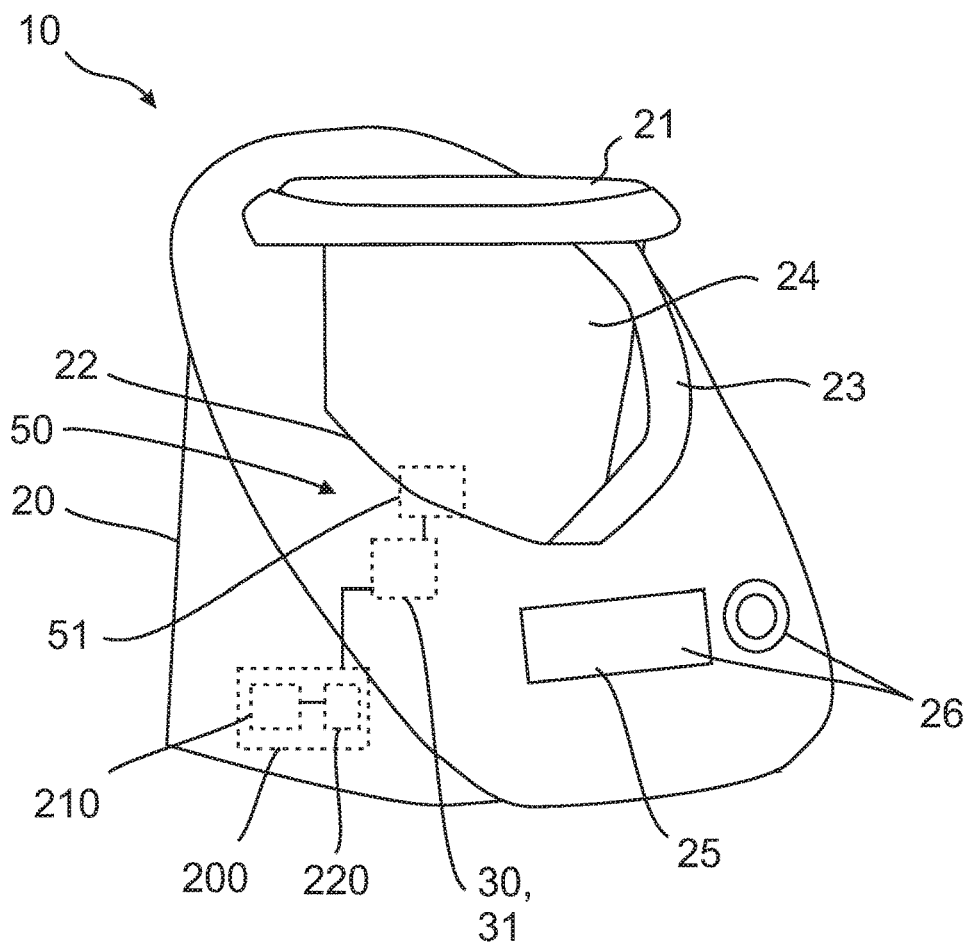
FIG. 1 is a schematic view of a food processor according to the invention.
Figure 2:
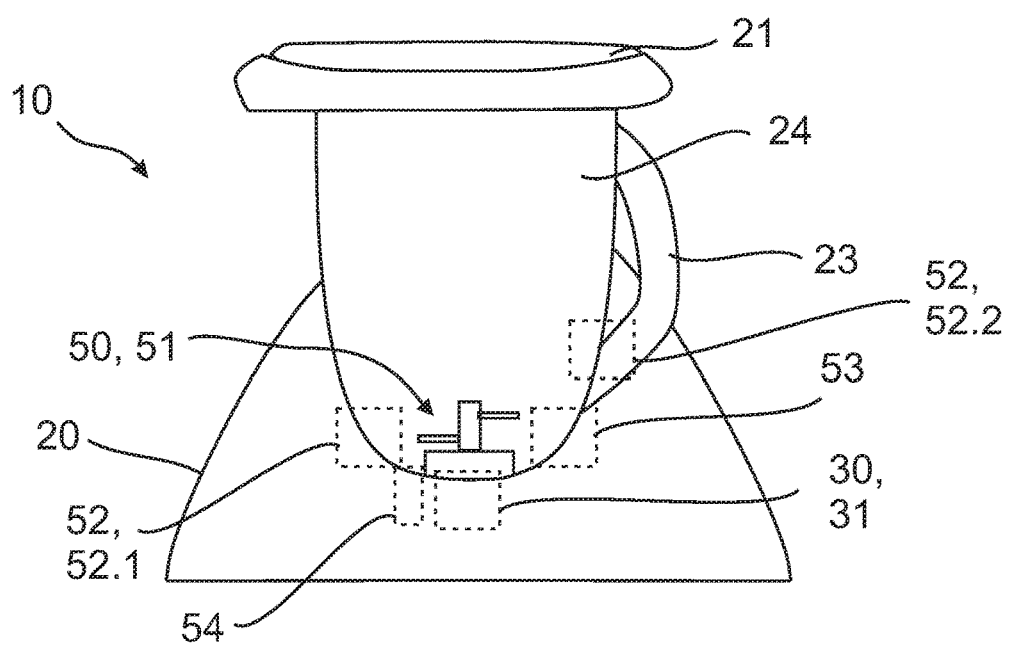
FIG. 2 is a further schematic view of a food processor according to the invention.

A food processor 10 according to the invention is shown schematically in FIGS. 1 and 2. The food processor 10 comprises a housing 20 which comprises a holder 22 for a mixing vessel 24. In this case, the mixing vessel 24 can for example be closed by a lid 21 and preferably comprises a handle 23. A mixer 51 and/or a heating element 53 and/or at least one sensor 52 is preferably arranged in the region of the mixing vessel 24 and/or in the inside of the mixing vessel 24. Furthermore, a first sensor 52.1 and a second sensor 52.2 may also be provided, which sensors are each arranged for example at different regions of the food processor 10, inside or outside the food processor 10, for acquiring different acquisition variables 102. Moreover, the food processor 10 comprises a control panel 26 which for example comprises a display 25, preferably a touchscreen 25. In this case, the display 25 is used in particular both as an input means and as an output means. The control panel 26 in particular makes it possible for a user of the food processor 10 to set and/or activate and/or deactivate control parameters and/or operating parameters, such as the mixer speed, the heating temperature and/or the time period for the preparation or the mixing process, and/or different programs of the food processor 10. Furthermore, the display 25 can also output recipe-related instructions and/or advice and/or graphical operating elements. The food processor 10 according to the invention can be operated by means of the graphical operating elements, as input means, which elements are preferably part of a graphical user interface. The recipes are for example stored in a non-volatile memory 220 of the food processor 10. In particular, the input means also allows for a preparation mode to be activated and/or deactivated, and/or for the type of preparation, and/or the type of food to be prepared, and/or (directly or indirectly) the type or number of acquisition variables 102 to be acquired, to be set.

As shown in FIGS. 1 and 2, the food processor 10 comprises at least one processing device 50, which in particular comprises at least one processing tool 51, such as a mixer 51. For the purpose of monitoring and/or control 160, in particular of the processing devices 50, at least one monitoring device 200 is furthermore provided, which device for example comprises a processing device 210 and/or the memory 220. It may furthermore be possible for the processing device 50 and/or further processing devices 50 to comprise the at least one sensor 52 and/or a heating means 53 and/or scale 54 which are integrated in the food processor 10 for example. The scale 54 is used in particular for acquiring or measuring a weight force on the mixing vessel 24. For this purpose, the object to be weighed is for example placed on and/or poured into the mixing vessel 24. The heating means 53 is for example designed such that the food can be heated in the mixing vessel 24 by the heating means 53, preferably up to temperatures in a range of from 10° C. to 150° C., preferably 30° C. to 120° C.

FIG. 2 furthermore schematically shows a drive means 30 of the food processor 10, which drive means comprises an (electric) motor 31. In this case, the drive means 30 and/or the motor 31 is connected to at least one processing device 50 and/or to at least one processing tool 51, in particular the mixer 51, such that force transmission takes place from the motor 31 and/or a drive shaft of the drive means 30 to the processing device 50 and/or the processing tool 51 and/or the mixer 51. It may be possible for the monitoring device 200 to be electrically connected at least to the sensor 52 and/or to the processing device 50 and/or to the drive means 30 and/or to the motor 31 of the drive means 30 for the purpose of monitoring.

Figure 3:
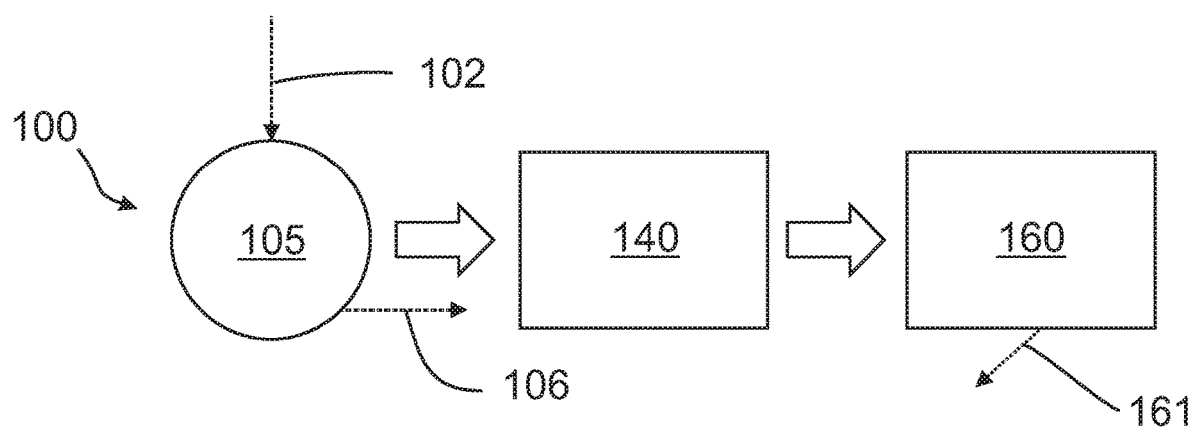
FIGS. 3-8 are schematic views for illustrating a method according to the invention.

FIG. 3 schematically illustrates a method 100 according to the invention. In this case, according to a first method step, at least one acquisition 105 of at least one or two acquisition variables 102 specific for a preparation state is performed on the food processor 10. In this case, the acquisition 105 identifies temporally successive acquisition values 106, for example the acquisition values 106 being specific for at least one acquisition variable 102, in particular a preparation parameter, of the food processor 10, i.e. for example being proportional to the motor current of the motor 31 of the drive means 30 of the food processor 10. Subsequently, a time-dependent analysis 140 of at least one item of analysis information is carried out, wherein the analysis information is determined on the basis of the temporally successive acquisition values 106. In this case, an analysis result of the time-dependent analysis 140 influences a control operation 160, in particular of the processing device 50. In this case, at least one control signal 161 is emitted, on the basis of the analysis result, which signal influences the preparation mode, i.e. for example the operation of the processing device 50. In this case, the control signal 161 is emitted for example by a processing device 210 and/or by the monitoring device 200 and/or by a control device (not shown).

Figure 4:
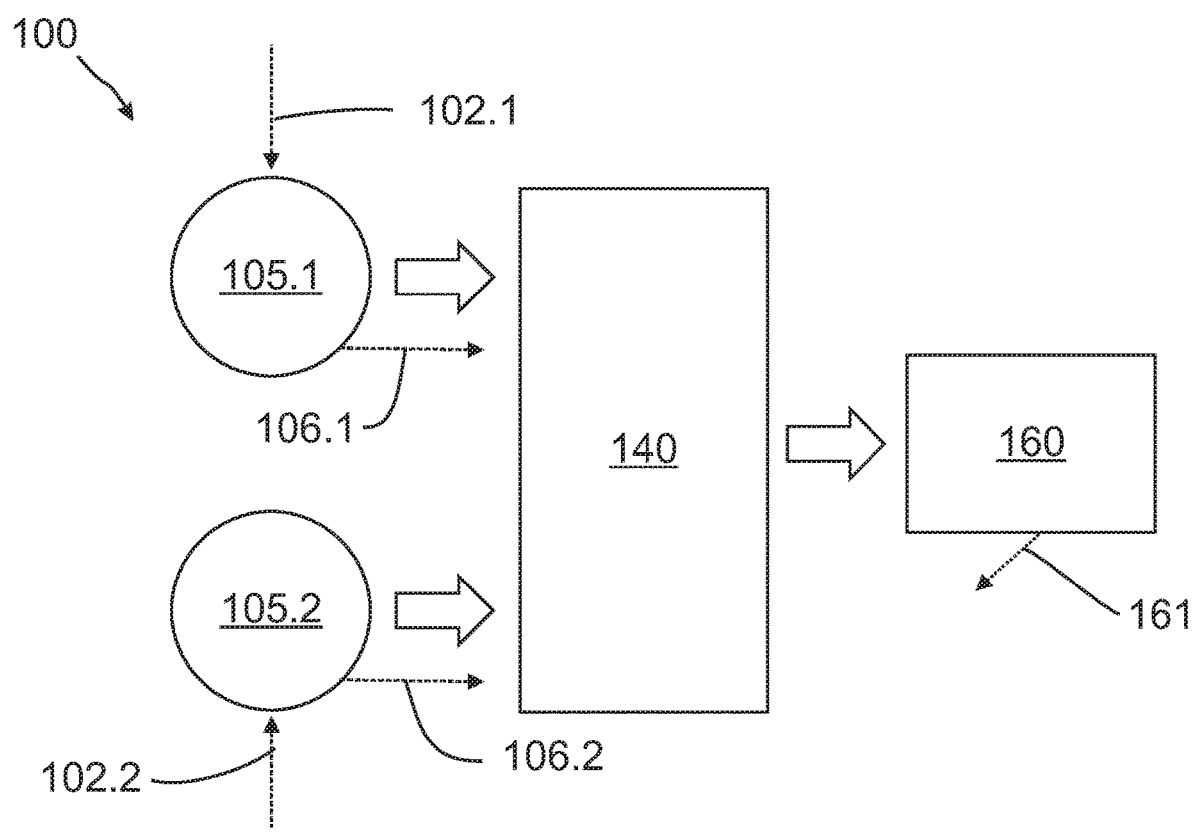

The method according to the invention is detailed in FIG. 4. It can be discerned here that (e.g. by a monitoring device 200), a determination of acquisition values 106 by acquisition 105 of acquisition variables (102) (at least specific to a preparation state) on the food processor 10 is carried out. In this case, at least one first acquisition value 106.1 is identified by a first acquisition 105.1 of a first acquisition variable 102.1, and at least one second acquisition values 106.2 is identified by a second acquisition 105.2 of a second acquisition variable 102.2, wherein the second acquisition variable 102.2 differs from the first acquisition variable 102.1. Subsequently, at least one analysis information is determined dependent upon the first acquisition value 106.1 and/or the second acquisition value 106.2. Then, a time-dependent analysis 140 is carried out, which determines an analysis result e.g. based upon analysis information. By a control 160 and/or activation 160, a control signal 161 is emitted subsequently dependent upon the analysis result.

Figure 5:
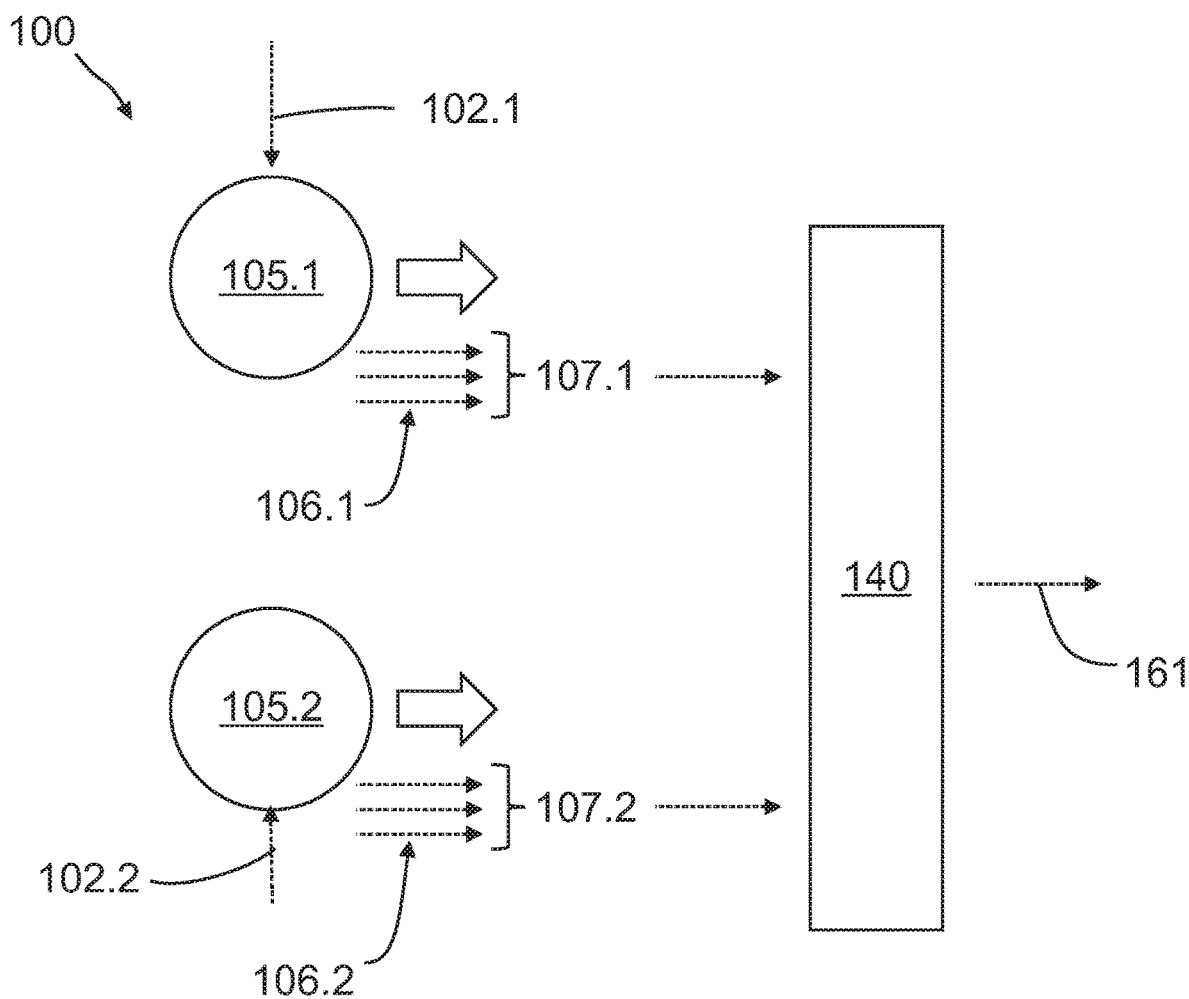

FIG. 5 also shows that a first (temporal) curve 107.1 can be identified from the at least one identified acquisition value 106.1, and a second (temporal) course 107.2 can be identified from the at least second identified acquisition values 106.2, in particular by buffering the acquisition values 106. Subsequently, a filtering 110 of the first course 107.1 and/or of the second course 107.2 can be effected, and the respective filtered or non-filtered course or curve 107 can be taken into account for the analysis 140.

Figure 6:
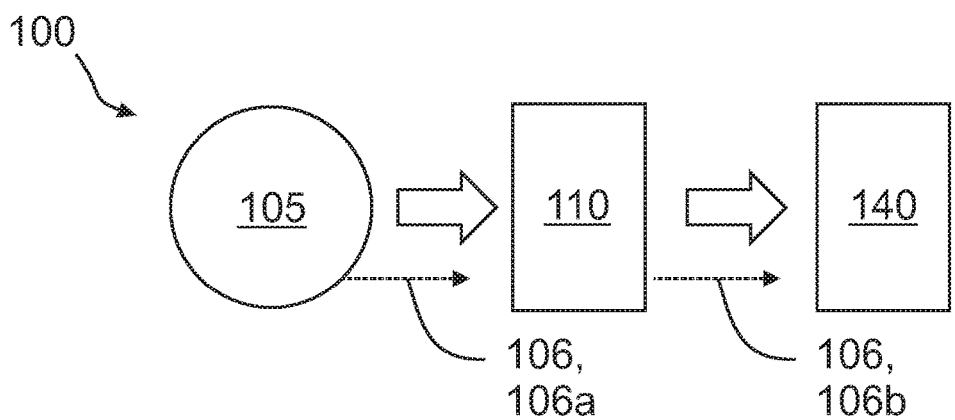

FIG. 6 shows that, following an acquisition 105 for identifying the acquisition values 106, the acquisition values 106 may undergo further signal processing in order in particular to determine analysis information as a result thereof. During the signal processing, for example filtering 110 of the identified (unfiltered) acquisition values 106, 106a is first performed, as a result of which the filtered acquisition values 106, 106b are determined. This for example also makes it possible to smooth a time curve 107 of the acquisition values 106. Subsequently, it may be possible for evaluation of the filtered acquisition values 106b to be performed, preferably generation of features 121 and/or feature evaluation. In order to evaluate the features, it is possible for example to compare the generated features 121 with a threshold value 171 and/or to perform a frequency analysis. Subsequently, for example a time-dependent analysis 140 is performed on the basis of the filtered (identified) acquisition values 106, 106b.

Figure 7:
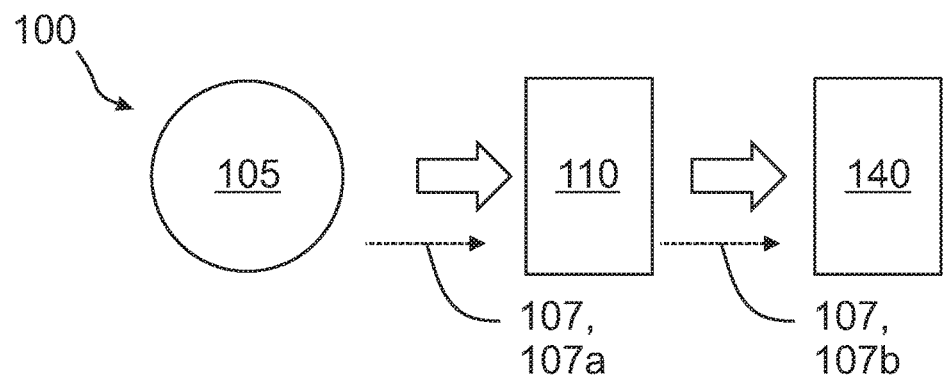

It is also conceivable for filtering of the time curve 107 of the acquisition values 106 to be performed alternatively or in addition. This is shown schematically in FIG. 7, on the basis of an unfiltered curve 107a of unfiltered acquisition values 106a. In this case, the unfiltered acquisition values 106a are identified for example by means of acquisition 105 of a measurement variable M as the acquisition variable 102, for example a motor signal. In order to smooth the unfiltered acquisition values 106a, filtering 110 of the curve 107 may be performed, as a result of which a filtered time curve 107b is identified. In this case, the filtering 110 allows for improved and more reliable evaluation of the acquisition values 106 and/or of the curve 107, for example by means of the time-dependent analysis 140.

Figure 8:
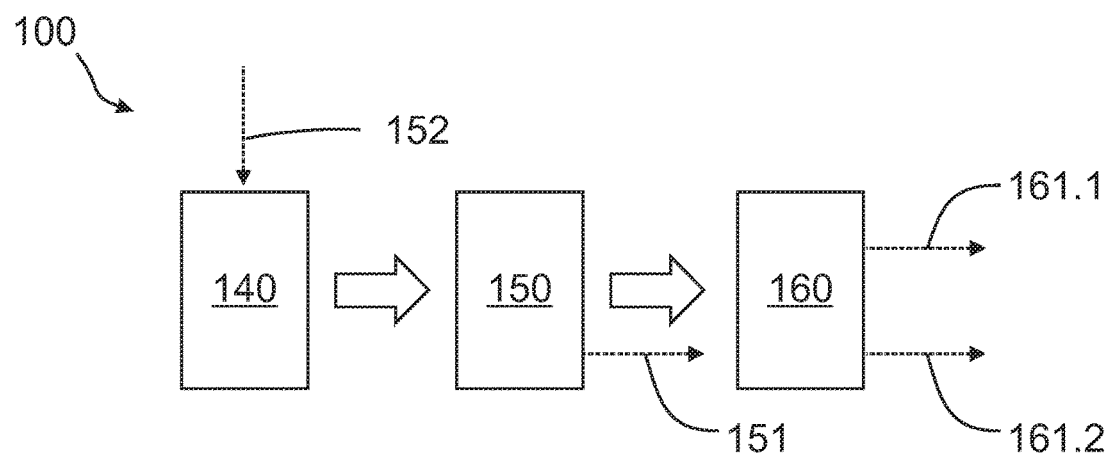

The time-dependent analysis 140 can for example be performed on the basis of the filtered time curve 107b and/or on the basis of the unfiltered time curve 107a and/or on the basis of the generated features 121 and/or on the basis of the filtered acquisition values 106b and/or on the basis of the unfiltered acquisition values 106a. The time-dependent analysis 140 is preferably a frequency analysis. As shown in FIG. 8, a positive or negative decision result 151 is determined on the basis of an analysis result of the time-dependent analysis 140, a decision 150 being carried out for this purpose.

In particular, a positive decision result 151 is determined only when the analysis result indicates a (desired) specified future preparation state, for example an optimal completion time of the preparation. In this case, in the event of a negative decision result 151, the preparation mode is not influenced and/or no control signal 161 is emitted. In other words, the preparation of the food continues as normal in the preparation mode. In particular, however, there can moreover also be further abortion conditions for the preparation mode, such that the preparation mode is automatically deactivated for example when a maximum time period of the preparation mode is exceeded, irrespective of the analysis result. After the negative decision result 151 has been determined, at least one acquisition 105 and/or one time-dependent analysis 140 is performed again (for example automatically and/or after a specified time period and/or cyclically). However, if a positive decision result 151 is determined, the processing device 50 is controlled 160, by means of a control signal 161 being emitted, in order to influence the preparation mode (see FIG. 8). In order to carry out the decision 150, in addition at least one threshold value 171 can also be consulted for the plausibility check.

FIG. 8 furthermore shows that at least one first and second control signal 161.1, 161.2 can be emitted, which signals differ from one another for example with respect to the type of control. It is in particular possible in this case for the first control signal 161.1 to be emitted, when a first analysis result is determined, such that the preparation is influenced in a first manner, in particular by reducing a speed of a mixer 51 of the food processor 10 in a time-critical portion of the time-dependent analysis 140, and for the second control signal 161.2 to be emitted, when a second analysis result is determined, such that the preparation is influenced in a second manner which differs from the first manner, in particular by terminating the preparation mode.

Figure 9:
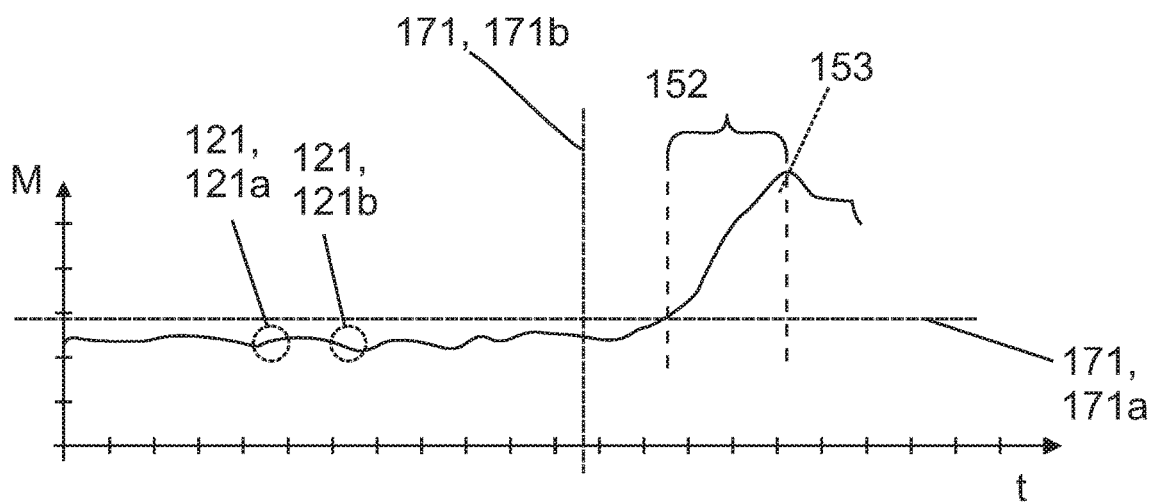
FIG. 9 is a schematic view of an acquisition value curve.

FIG. 9 shows a typical time curve 107, in particular filtered curve 107b, of the acquisition values 106, for example for the preparation of whipped cream. The filtered acquisition values 106b shown are dependent for example on a motor signal M as the acquisition variable 102. It can be seen that initially (up to the second threshold value 171b), only minor fluctuations occur, and a steady trend can thus be identified. The features 121 can be generated for example by means of a difference and/or a gradient of the acquisition values 106 being determined. A feature evaluation then makes it possible, for example, for the generated feature 121 to be used for identifying a specific pattern in the curve 107. For this purpose, the time-dependent analysis 140 for example can also be performed on the basis of the acquisition values 106 and/or generated features 121. In this case, the threshold values 171 can be used to check the plausibility of the analysis result. The threshold values 171 are in particular defined empirically, such that for example a second threshold value 171b specifies the timepoint at which the desired preparation state (e.g. the desired consistency of the whipped cream) occurs at the earliest. In this case, a curve pattern 152 can be identified in the marked range 152 that indicates the desired timepoint of the preparation. In this case, the occurrence of the curve pattern 152, i.e. for example the specific change in the gradient and/or the trend, results in particular from the influence of the food on the processing device 50. It is thus possible, for example, for the consistency, which has changed owing to the preparation, to cause a mixing resistance to increase or decrease and thus the motor current of the electromotor 31 for the mixer 51 to increase or decrease accordingly. The acquisition values 106 are therefore dependent on the preparation (for example the mixing resistance, and the curve pattern 152 of the acquisition values 106 can thus be used in particular for evaluating the preparation and/or consistency.

The curve pattern 152 is for example empirically pre-defined. It may be possible for a comparison specification such as the curve pattern 152 to be detected by means of the time-dependent analysis 140 and/or the process of carrying out the decision 150. Detection of the curve pattern 152 then allows for early prediction of a critical point 153 at which the desired preparation state occurs. In particular, the steps of the method 100 according to the invention can be adjusted and/or temporally defined for example by means of a real-time requirement, such that the control signal 161 is emitted in due time, despite an evaluation latency period, in order to influence and/or deactivate the preparation mode when the desired state or the critical point 153 has been temporally reached.

It may furthermore be possible for the acquisition values 106, in particular the filtered curve 107b, to be able to be consulted for generating features. It is thus possible to generate, for example, a first generated feature 121a and a second generated feature 121b by means of an evaluation. The first generated feature 121a in this case indicates for example a rise (i.e. a positive difference), and the further generated feature 121b in this case indicates for example a drop (i.e. a negative difference). It is furthermore possible for a comparison specification, in particular a curve pattern 152, in the curve pattern 107 to be detected by means of the feature evaluation and/or the time-dependent analysis 140. For this purpose, a histogram is evaluated for example. As shown in FIG. 9, the curve pattern 152 (on the basis of the prepared food) corresponds for example to a continuous increase in the acquisition values 106 over a specified phase.

Depending on the food, a first comparison specification, such as a first curve pattern 152, may exhibit a continuous rise in the acquisition values 106, and a second comparison specification, such as a second curve pattern 152, may exhibit a continuous drop in said values. On the basis of a user setting, the corresponding first or second comparison specification is then taken into account.

A plausibility check of the analysis result, in particular also the definition of the value range of the acquisition values 106 for carrying out the decision 150, is made possible by the threshold values 171. The threshold value 171 in particular comprises at least one first threshold value 171, 171a, which is shown by a dashed horizontal line in FIG. 7. A decision is carried out 150 and/or a positive decision result 151 is determined only when the acquisition values 106 currently identified are above the first threshold value 171, 171a. A second threshold value 171, 171b preferably makes it possible to define the period of time for carrying out the decision 150, which second threshold value is shown by a vertical dashed line. Correspondingly, a decision is carried out 150 and/or a positive decision result 151 is determined only when the temporal duration of the preparation mode temporally exceeds the second threshold value 171b.

The above explanation of the embodiments describes the present invention merely within the context of examples. Of course, individual features of the embodiments can, insofar as technically reasonable, be combined with one another as desired without departing from the scope of the present invention.

LIST OF REFERENCE CHARACTERS 10 food processor
20 housing
21 lid
22 mixing vessel holder
23 handle
24 mixing vessel
25 display
26 control panel
30 drive means
31 motor
50 processing device
51 processing tool, mixer
52 sensor
52.1 first sensor
52.2 second sensor
53 heating element
54 scale
100 method
101.1 first recording
101.2 second recording
102 acquisition variable
102.1 first acquisition variable
102.2 second acquisition variable
105 acquisition
105.1 first acquisition
105.2 second acquisition
106 acquisition values
106.1 first acquisition values
106.2 second acquisition values
106a unfiltered acquisition values
106b filtered acquisition values
107 curve
107.1 first curve
107.2 second curve
107a unfiltered curve
107b filtered curve
110 filtering
121 generated feature
121a first generated feature
121b second generated feature
140 time-dependent analysis
150 carrying out a decision
151 decision result
152 curve pattern
153 critical point
160 control
161 control signal
161.1 first control signal
161.2 second control signal
171 threshold value
171a first threshold value
171b second threshold value
200 monitoring device
210 processing device
220 non-volatile memory
t time
M measuring variable, motor signal

The invention claimed is:

1. A method for operating a food processor, wherein at least one processing device of the food processor is controlled, in a preparation mode, so as to at least partially automatically at least mix or heat food in a mixing vessel, and wherein a monitoring device comprises a first sensor and a second sensor and carries out an identification of acquisition values by acquisition, by the first and second sensors, of at least two acquisition variables, specific to a preparation state, on the food processor,
  wherein the processing device comprises a mixer, a heating element, a control device and the mixing vessel,
  wherein the at least two acquisition variables refer to a value that is a measurement value of the acquisition variable and each comprise at least one of the following variables:
    a rotary speed of the processing device,
    a parameter of a drive, wherein the drive comprises a motor,
    a motor signal, which depends upon a torque of the mixer of the food processor,
    a weight of the prepared food, wherein the weight is acquired by a scale integrated in the food processor,
    a brightness, which is acquired on the prepared food by an optical sensor,
    a noise level, which is acquired on the prepared food by an acoustic sensor,
    a consistency of the prepared food,
    an electric property of the prepared food,
    an odorous substance concentration at least on the prepared food or of the prepared food,
    a gustatory substance concentration at least on the prepared food or of the prepared food,
    at least one chemical variable of the prepared food,
    at least a pressure in a region of the prepared food or a pressure curve, and
    at least one spectral characteristic of the prepared food,
  the method comprising:
    a) identifying at least one first acquisition value by a first acquisition by the first sensor of a first acquisition variable;
    b) identifying at least one second acquisition value by a second acquisition by the second sensor of a second acquisition variable, wherein the second acquisition variable differs from the first acquisition variable;

c) determining, by the control device, at least one analysis information on the basis of at least one of the first acquisition value and the second acquisition value;

d) performing, by the control device, a time-dependent analysis of the analysis information in order to determine an analysis result specific to the preparation state, wherein the time-dependent analysis comprises a time series analysis of the temporal course or curve of the first acquisition values and second acquisition values and an interference statistical analysis for predicting the future development of the time series analysis; and e) emitting, by the control device, at least one control signal for influencing the preparation mode on the basis of the analysis result, such that the preparation state is taken into account during the preparation by defining at least one of a temporal mixing duration, a mixer speed or a temperature of the heating element.

2. The method according to claim 1, wherein at least one of the first and the second or both the first and second identified acquisition values are at least partially at least one of compared with one another and combined with one another.

3. The method according to claim 1, wherein at least one of the first and second acquisition variable each includes variables measurable on the food processor, which at least one of influence a property of the food changeable by the preparation respectively in a different manner and are influenced by the property, so that they are specific to a preparation state.

4. The method according to claim 1, wherein first acquisition values are at least one of periodically or repeatedly identified in the preparation mode, and at least one of second acquisition values or further acquisition values are at least one of simultaneously identified periodically or repeatedly in the preparation mode, wherein the analysis information is determined from a time course of the respective at least one of periodically or repeatedly identified acquisition values.

5. The method according to claim 1, wherein the second acquisition value is identified outside the preparation mode.

6. The method according to claim 1, wherein a further analysis of the analysis information is carried out temporally at least one of after or simultaneously to the time-dependent analysis, in order to determine the analysis result, wherein the further analysis differs from the time-dependent analysis.

7. The method according to claim 1, wherein the preparation state is a future optimal completion timepoint of the prepared food during the preparation, wherein the control signal is emitted temporally in such a way that a deactivation of the preparation mode at the completion timepoint is caused.

8. The method according to claim 1, wherein a first and a second control signal is emitted, wherein:
the first control signal is emitted when a first analysis result is determined, so that the preparation is influenced in a first manner; and
the second control signal is emitted when a second analysis result is determined, so that the preparation is influenced in a second manner, which differs from the first manner.

9. The method according to claim 1, wherein the second acquisition variable is a surroundings parameter outside the food processor.

10. The method according to claim 1, wherein at least one of the time-dependent analysis and the determination of the analysis result is carried out in an adaptive manner.

11. The method according to claim 1, wherein at least one of the time-dependent analysis and the determination of the analysis result is effected dependent upon a parametrization.

12. The method according to claim 1, wherein in the time-dependent analysis, at least one comparison specification is evaluated dependent upon a prepared food, wherein, a comparison of the analysis information with the comparison specification is effected.

13. The method according to claim 1, wherein the following steps are provided:
at least one of setting and selecting a food to be prepared, by a user input on the food processor;
selecting a comparison specification dependent upon the set food; and
comparing values of at least one of the analysis information and of the analysis result with the comparison specification, in order to determine a future determined state specified to the food.

14. The method according to claim 1, wherein a selection of the comparison specification is effected in such a way that the comparison specification is read from a database dependent upon a set food.

15. The method according to claim 1, wherein in the preparation mode, the processing device is controlled for the at least partially automatic preparation of different foods, wherein at least one food-specific comparison specification is at least one of provided or pre-stored for each of these foods.

16. The method according to claim 1, wherein a comparison specification includes an information about an acquisition variable selection, wherein the comparison specification is selected dependent upon the set food, and in the acquisition, the acquisition variables are acquired which are predetermined by the acquisition variable selection of the selected comparison specification, so that in the selection of a first food to be prepared, at least one different acquisition variable is acquired than in the selection of a second food to be prepared.

* * * * *